United States Patent [19]
Spink et al.

[11] Patent Number: 5,867,309
[45] Date of Patent: Feb. 2, 1999

[54] STEREOMICROSCOPE

[75] Inventors: Roger Spink, Balgach; Bernhard Braunecker, Rebstein; John Rice Rogers; Klaus-Peter Zimmer, both of Heerbugg, all of Switzerland

[73] Assignee: Leica Geosystems AG, Heerbrugg, Switzerland

[21] Appl. No.: 718,451

[22] PCT Filed: Mar. 29, 1995

[86] PCT No.: PCT/EP95/01186

§ 371 Date: Nov. 27, 1996

§ 102(e) Date: Nov. 27, 1996

[87] PCT Pub. No.: WO95/27226

PCT Pub. Date: Oct. 12, 1995

[30] Foreign Application Priority Data

Mar. 30, 1994 [CH] Switzerland ............................... 949/94
Apr. 14, 1994 [CH] Switzerland ............................. 1295/94
May 17, 1994 [CH] Switzerland ............................. 1525/94

[51] Int. Cl.⁶ .................................................. G02B 21/22
[52] U.S. Cl. .......................... 359/377; 359/363; 348/203
[58] Field of Search ..................... 359/377, 376, 359/363, 375; 348/42, 43, 49, 55, 56, 79, 203, 205; 352/62

[56] References Cited

U.S. PATENT DOCUMENTS

| | | | |
|---|---|---|---|
| 3,251,933 | 5/1966 | Beste | 348/42 |
| 3,574,295 | 4/1971 | Tasaki | 359/363 |
| 3,614,314 | 10/1971 | Rossire | 348/42 |
| 3,770,887 | 11/1973 | Van Buskirk | 348/49 |
| 3,818,125 | 6/1974 | Butterfield | 359/376 |
| 4,492,441 | 1/1985 | Hopkins | 359/377 |
| 4,586,819 | 5/1986 | Tochigi et al. | 356/301 |
| 4,662,727 | 5/1987 | Griffin | 350/500 |
| 4,674,845 | 6/1987 | Matsumura | 359/377 |
| 4,678,298 | 7/1987 | Perisic | 352/62 |
| 4,734,756 | 3/1988 | Butterfield et al. | 348/43 |
| 5,003,385 | 3/1991 | Sudo | 358/88 |
| 5,007,715 | 4/1991 | Verhulst | 350/334 |
| 5,028,994 | 7/1991 | Miyakawa et al. | 358/92 |
| 5,067,805 | 11/1991 | Corle et al. | 359/235 |

FOREIGN PATENT DOCUMENTS

| | | | |
|---|---|---|---|
| 388655 | 6/1965 | Switzerland | 359/377 |
| 95/18511 | 7/1995 | WIPO | |
| 95/18512 | 7/1995 | WIPO | |

Primary Examiner—Jon W. Henry
Attorney, Agent, or Firm—Foley & Lardner

[57] ABSTRACT

A stereomicroscope has a left and a right stereo radiation path and adjusting means for selecting a stereo base. The main lens is arranged between an object to be observed and the adjusting means, which are preferably designed as opto-mechanical switching means. This arrangement allows an integrated structure with low light losses to be obtained.

11 Claims, 12 Drawing Sheets

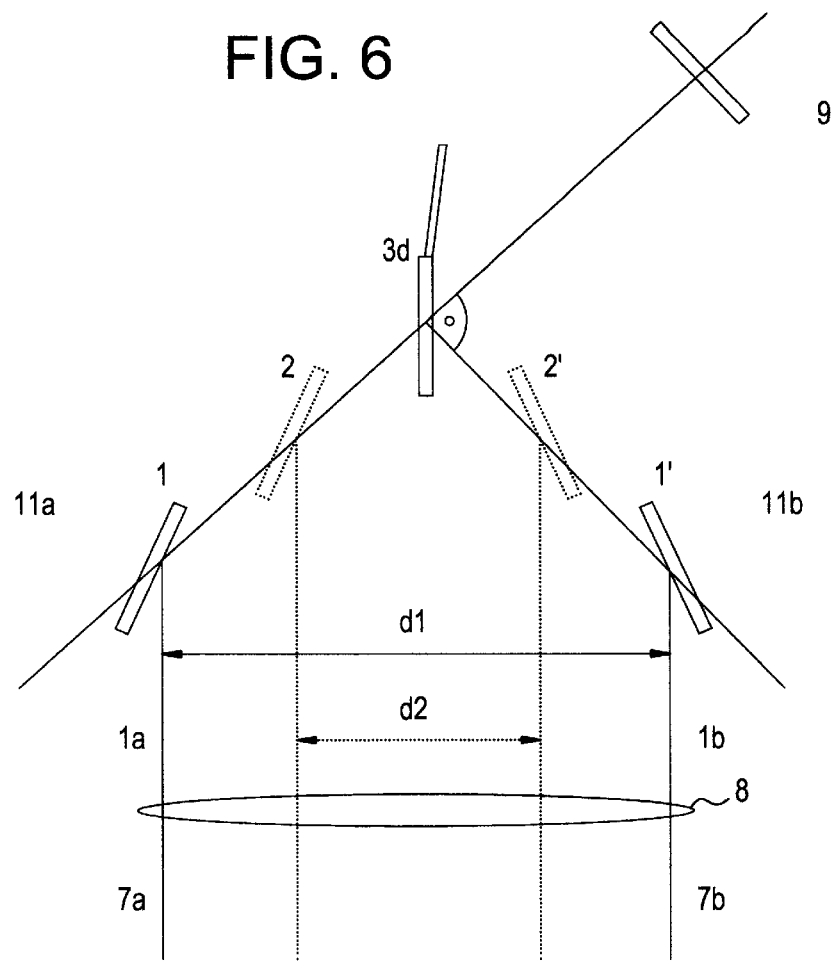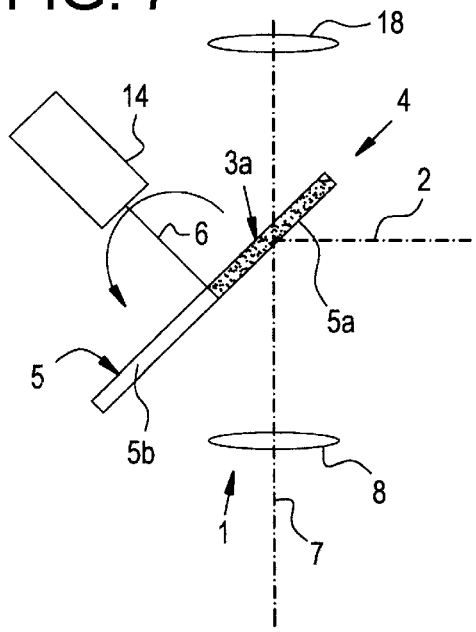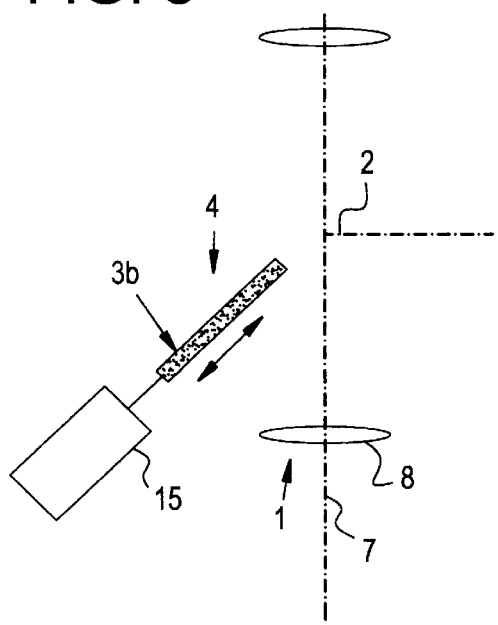

FIG. 21
1) Arrangement having polarization for encoding the
   left and right beam paths:
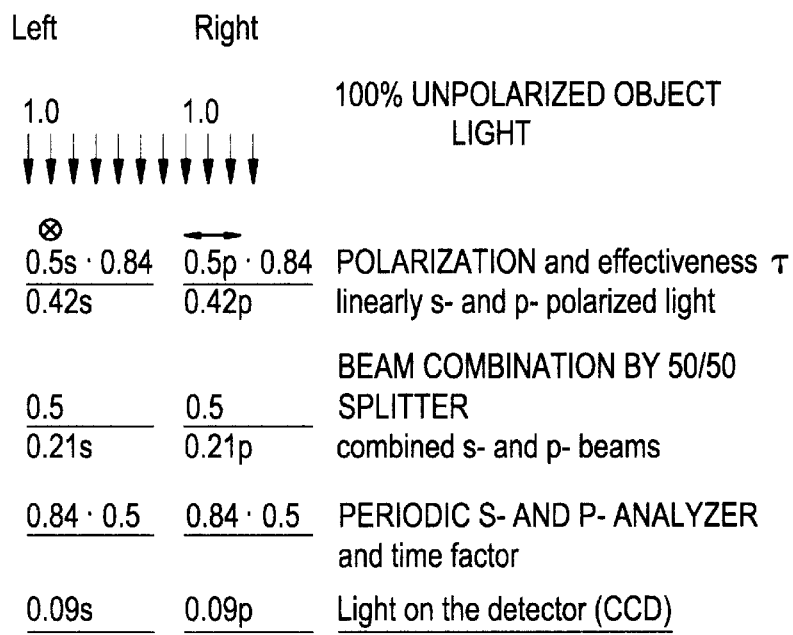
2) Arrangement having reflection aperture diaphragms
   for the consecutive switching of the left and right
   beam path:
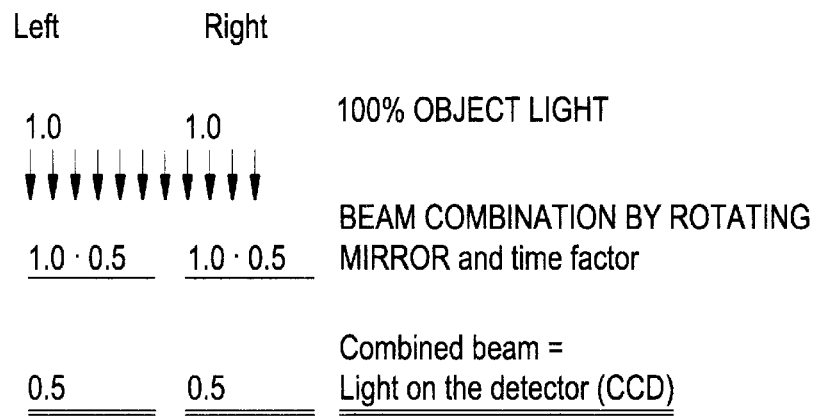
3) Relation of 1) to 2):
   Improvement:
   $$0.5 / 0.09 = 5.5$$
   Note:
   Serial sampling is used in both solutions.

STEREOMICROSCOPE

BACKGROUND

The invention relates to a stereomicroscope.

Stereomicroscopes having a capability for adjusting the stereo base are described in U.S. Pat. No. 3,818,125 (Butterfield, 1971). Although different variations of possibilities for varying the stereo base are described there, such devices have not become widespread in practice. This is in spite of the fact that the disadvantages which are known and specified by Butterfield in the case of stereomicroscopes without stereo base adjustment are still present. To this extent, reference is made to the relevant description parts—in particular in column 2, lines 43–62—in Butterfield, which count as disclosed herein. The reason for not using the teachings of Butterfield apparently lies in various problems which result from his solution proposals. Thus, for example, the use of prisms is excluded (e.g. FIGS. 5–9 in Butterfield), since, as Butterfield himself admits (column 9, lines 65 and 66 of Butterfield), these are accompanied by color aberrations which can have a negative influence on the color quality of the viewed image.

The variations proposed by Butterfield having displaceable aperture diaphragms (10, e.g. FIGS. 2 and 5) furthermore have the disadvantage that as a result of a displacement of the latter not only is the stereo base adjusted but in addition the image brightness is darkened or changed, which can disadvantageously lead to too low a light yield, in particular in the case of small stereo bases.

Similar disadvantages occur in the case of the solution proposal in accordance with FIG. 10 of Butterfield. To be specific, as a result of the pivoting of the mirror (50), not only is the stereo base adjusted, but the aperture is also changed, which in turn can lead to corresponding light losses.

The variants proposed by Butterfield according to FIGS. 11 and 12 are in turn complicated and can be implemented only with difficulty to the extent that two parallel lens systems (54) are necessary there, which are associated with a corresponding increase in price and also a corresponding increase in constructional size, with further penalties in terms of light as a result of possibly too small an aperture. Furthermore, it is generally also difficult to adjust such parallel lens systems such that they have identical properties. However, if the properties are not identical, this can lead to fatigue in the observer, in particular if a video camera and monitor are connected in front of said observer, since he does not have the possibility of recorrecting individually, as in the case of two eyepiece beam paths.

It is therefore an object of the present invention to develop a system which, in spite of a variable stereo base, does not reduce the light intensity in the beam path—at least for a certain period and for each beam path separately—by a significant amount. In addition, it is intended to enable recordings—as known per se—using only a single image recording device, for example using a single video camera. Preferably, it is furthermore intended to provide only one main objective and to restrict the constructional size of the stereomicroscope to a minimum.

This object is achieved, for example, by means of the features described herein. As a result of the arrangement of the adjusting device behind the main objective, there is an integrated construction with low light losses and without the disadvantages listed above.

A practical application of the invention results, for example, in the case of video stereomicroscopes.

For such microscopes, but also for other microscopes, a special development of the invention is proposed which can also be applied independently of the invention. To explain the background:

Microscopes often have beam splitters in order to duplicate the beam path directed towards the object to be magnified.

Often provided on split beam paths are, inter alia, additional observer eyepieces, phototubes, camera connections or displays of all types, the images from which are intended to be inserted—that is to say superimposed on the image of the viewed object. This applies in particular also to stereomicroscopes which have an image recording device for producing a stereo view on a 3D display—possibly remote from the microscope.

For the last application, from time to time such an image recording device (e.g. a CCD each) is provided both for the beam path assigned to the left eye and also for the beam path assigned to the right eye.

For the application having the inserted display, in an analogous manner a display (e.g. a CRT each) is provided for the beam path assigned to the left and also to the right eye.

These known stereomicroscopes thus have the disadvantage that two magnification devices (zoom, turret) and two image recording devices or two displays, together with appropriate optics, are necessary. In this case, the left and right image recording devices or optics must be mutually adjusted.

In other known stereomicroscopes there are also solutions having only a single image recording device.

There, both the left and the right beam path or the ray bundle located in them are alternately fed to the single image recording device. As a result of such a construction, a second image recording device is saved and, inter alia, the serial recording of a stereoimage pair on one video recording device is facilitated. The changeover process between the two beam paths is in this case achieved using beam splitters and shutters which block off the respective undesired bundle of rays via polarization changes using correspondingly arranged analyzers.

Such a stereomicroscope having geometric superimposition of the right and left frames is described, for example, in U.S. Pat. No. 5,007,715.

The system which is described in U.S. Pat. No. 5,007,715 has the disadvantage that, both during the polarization (about 50%) and during the superimposition (about 50%) of the two polarized bundles of rays by means of a beam splitter, up to 80% of the light intensity which is present of the respective bundles of rays (100%) are lost. A partial superimposition of the two different sets of image information from the right and left image beam paths can make itself noticeable as a further disadvantage if the darkening by the analyzers is not 100%, which can primarily also occur if the polarizers do not operate satisfactorily. Since however it is precisely in microscopes that the brightness on the object to be viewed cannot be arbitrarily increased, the permanent loss in light intensity is disadvantageous. The partial superimposition, on the other hand, can lead to unnecessary stresses for the organs of sight of the observer.

A similar known system is described in U.S. Pat. No. 5,003,385, where likewise about 80% of the light intensity of the left and right beam paths are absorbed before the light is incident on the single camera.

A somewhat different system, where the polarization of the light remains unconsidered, is described in U.S. Pat. No.

5,028,994. There, the light from two first beam paths (left and right beam path) is firstly fed in each case to an LC shutter (twisted nematic type), which can open or close the relevant beam path. The two beam paths are incident— deflected via mirrors—on a beam splitter. If one shutter is open, then the second shutter is closed, for which reason theoretically it is always only possible for light from one of the two first beam paths to arrive at the camera arranged downstream of the beam splitter. At the beam splitter, in each case about 50% of the light intensity is lost; likewise at the shutter, even in the "open condition", about 50% in each case is lost, since the described shutter structure (cf. column 2 line 48 to column 3 line 29) permit only light of a specific polarization direction to pass through. In addition, in the case of the described shutter, the abovementioned disadvantages of partial superimposition may also occur.

SUMMARY OF THE INVENTION

It is therefore an object of the present development to develop a system which reduces the light intensity in the beam path—at least for a specific period and separately for each beam path—in the case of using beam splitters at a maximum to the extent of the light intensity lost there (as a rule about 50%). In other words: a gain of about 50% of the light intensity—both in the case of recording and in the case of the insertion of images—is intended to be possible by contrast with conventional stereomicroscopes, although only a single image recording device or only a single display is provided for both beam paths. Furthermore, the superimposition between the right and the left image beam path is intended to be excluded.

This additional object is achieved by means of an features described below. The same problems or the same objects for microscopes having images to be reflected in instead of images to be recorded are also solved for the first time.

For the specific further processing of video images which have been obtained using a video stereomicroscope according to the invention, reference is made to the PCT patent application, having priorities of the three applications CH3890/93-3; CH135/94-3 and CH198/94-5, which also count as lying within the scope of this disclosure. All the applications mentioned together, and the inventions on which they are based, are symbiotically complementary in the case of corresponding exemplary embodiments.

The geometrical superimposition of a left and right stereobeam path then enables the recording of the two beam paths by only one video camera, with the result that images located alongside one another can be recorded successively in time and further processed. This development of the invention thus also enables the reproduction of images via one monitor, as described for example in U.S. Pat. No. 5,007,715. The statements disclosed in relation to the figure in the abstract also count as disclosed herein.

The use according to the invention of mechanical aperture diaphragms which either completely reflect light or allow light to pass through completely, has the effect, at least during the respective duration of a specific switching position of the aperture diaphragm, of forwarding the complete light intensity of the light located in the relevant beam path. The encoding process for the light, such as for example in the use of polarization, as also proposed by Butterfield, is therefore dispensed with. In this case, only insertion or blanking out is used. This results in a gain in intensity of up to over 200%, compared with known arrangements having splitters and polarization filters. An undesired superimposition of two beam paths is excluded—advantageously by contrast with the use of polarization. As a result of this development of the invention, in addition the further object is thus achieved of effecting a light intensity loss which is only low, in spite of geometric beam splitting.

Although the use of mechanical aperture diaphragms in optical systems—even if for completely different purposes—is known in principle, thus, for example, reference is made to a Nipkow disk, such as is represented for example in U.S. Pat. No. 5,067,805, or to rigid mechanical beam splitters in which, for example part of the light in the beam path is allowed through at an annular aperture diaphragm and another part is reflected back for beam splitting, these known mechanical beam splitters do not reduce the actual light intensity loss, since following the splitting, in each subsequent beam path in each case only part of the original 100% light intensity is forwarded. The other part is in fact deflected further by the splitter into the second beam path.

Individual applications having monochromatic light could reduce splitting losses at splitters to a residual, which however is not possible if it is desired to use the entire light spectrum.

A partial aspect of the invention is therefore found in the case of a microscope, in particular a stereomicroscope, having a first beam path and a beam splitter in this beam path, the beam splitter being designed as a mechanooptical or electrooptical switching element which can be transferred alternately from a reflective into a transmissive or another reflective state, one of the two states exposing the light path for the first beam path and the other state exposing the light path for a second beam path, while blocking the light path for the viewing beam path. Such a switching element thus replaces conventional beam splitters, by which means the light loss can be reduced significantly.

Within the scope of the invention there are various further types of design and variants thereto, which are described below.

In the case of a preferred variant, the entry bundles of rays of the stereomicroscope are geometrically superimposed— but chronologically one after the other—after the (single) main objective, either by means of a rotating mirror having at least in each case one transmissive and reflective subregion or by means of a stationary splitter and a rotating aperture diaphragm which alternately covers the entry beam paths. In this case it is favorable if both beam paths have the same optical path lengths as far as the image recording device. In the sense of the invention, it is in this case not important in which form the reflecting aperture diaphragms are introduced. Translatory movements are in this case to be equated with rotating movements or other switching movements. Thus, for example, it is thus entirely possible to provide aperture diaphragms similar to photographic camera shutters, but which are appropriately silvered on at least one side. A variant having micromechanical lamellar mirrors is likewise conceivable, such lamellar mirrors—at present these are essentially only in laboratory experiments—being generally constructed from silicon and being switched by means of electrostatic charges.

If, as in one exemplary embodiment, a rotating glass disk is used which is silvered on one half, a practical, easily balanced arrangement is given thereby, which however has one small disadvantage; on the non-silvered glass half, because of the plane plate effect, an image offset occurs. In order to avoid this, in the case of a preferred variant, the glass is omitted at this point, so that a completely free light passage is possible there.

In the case of all pushed-in or turned-in aperture diaphragms, since the effect of the moving aperture diaphragm can be disadvantageous in certain circumstances for recordings on image recording devices, for example CCDs, provision is further made in some embodiments for the displacement or rotational movement to be carried out particularly rapidly and for the aperture diaphragm to remain in the switching position then assumed for a certain time. In the case of rotating aperture diaphragms, a drive having a stepping motor is particularly suitable for this. A corresponding addition or alternative for this technique results from a clocked exposure control of a video camera which is possibly being used, or a display which is being used.

If appropriate, additional light may be fed to the object via the said silvered surface via a further mirror arrangement. It might even be possible, under certain circumstances, for other more complicated illumination devices to be omitted as a result.

A further variant having a 50/50 pupil splitter is advantageous in as much as only one glass splitter per beam path is necessary and, in the eyepiece beam path, depending on the splitter effect of this glass splitter, a ratio of, for example, 25% display and 50% object or (at the eyepiece) for example 50% display and 50% object can be achieved. The first, for example, in the case of a glass splitter of about 1/1 partial effect, the latter for example using a glass splitter of about 2/2 partial effect.

A further variant, which integrates the illumination completely into the structure, results if the switching element is used twice, in that the reflecting surface is used on both sides. In the pivoted-in state, it lies at the point of intersection of the axes of the first beam paths, preferably at an angle of 45° each to the said axes. Arranged in direct prolongation of one of the first beam paths is a light source whose light, in the pivoted-in state of the switching element, is reflected into the one beam path, whereas it falls directly into the other first beam path in the pivoted-out state. In this way, optimal illumination of a viewed object is possible.

It is further preferred to place the aperture diaphragm or the splitter mirror as close as possible to the main objective, in order to avoid vignetting of the reproduced images.

A variant having a plurality of circular segment-like reflectors reduces the required number of revolutions of a rotating mirror.

The use of plane plates as a stereo base setting is constructionally simple. The disadvantages of the use of prisms, as in Butterfield, are omitted thereby. The mechanical construction is simple to realize, miniaturization and any automatic and/or remote control is simple. Coupling to the magnification setting of the stereomicroscope and/or to a zoom setting is therefore conceivably simple. The light losses are minimum in contrast with the use of aperture diaphragms as in Butterfield.

A special design of the invention in accordance serves to reflect in information for an observer of an eyepiece beam path. All the previously mentioned specific and advantageous designs and variants can be used practically also in conjunction with this structure.

If, in conjunction with such a stereomicroscope, in each case a right and a left frame of a stereoimage pair is displayed on the display, the observer thus obtains a 3D image to view, which is superimposed on the 3D image of the eyepiece beam path. Advantageously, it is possible thereby for, for example, positron ray images or magnetic resonance stereoimages to be superimposed on the currently seen images. In the case of the use of such a stereomicroscope as a surgical microscope, this results in particular advantages for the surgeon, especially since he can interpret the image seen in a better way. On the other hand, the reflected-in images could also contain other information, for example about the control of devices or of the microscope itself. In this connection, reference is made to the following Swiss patent applications, whose content likewise counts as disclosed within the scope of this invention: CH 3890/93-3; CH 135/94-3; CH 198/94-5. A combination of the teachings of these applications with the present application is particularly practical. In particular, a combination having mechanical beam splitters is preferred, since in this case a further light intensity gain of about 100% (a total of about 200%) is possible.

It is of course possible for the variant with the image recording device to be used simultaneously with the variant having the display, providing that a split-off beam path each is made available to both.

Instead of the mechanically moved aperture diaphragms, other types of aperture diaphragms could also be used, provided that they are only capable of changing one hundred percent between a transmitting and blocking state.

The invention is described in particular in conjunction with a stereomicroscope. In the widest sense, however, it can also be practically used with any other beam paths.

BRIEF DESCRIPTION OF THE DRAWINGS

Further details and designs of the invention emerge from the drawings. In the figures shown there:

FIG. 6 shows the principle of a construction having an LCD shutter element and two displaceable mirrors;

FIG. 7 shows the principle of a rotating beam splitter with a mirror surface;

FIG. 8 shows the principle of a translatably displaceable beam splitter with a mirror surface;

FIG. 21 shows an analytical listing of the high light losses caused by conventional technology 1) and a representation of the low light losses as a result of the technology according to the invention 2), as well as the advantage 3) resulting therefrom;

DETAILED DESCRIPTION OF EXEMPLARY EMBODIMENTS

The figures are described as a coherent whole. Identical reference symbols denote identical components. Identical reference symbols with different indices denote similar or functionally similar components. The invention is not restricted to the exemplary embodiments shown. Above all in combination with the teachings of the Swiss patent applications cited above and the US patents cited above, any further variants may be represented. They all fall under the disclosure content of this application.

Figure 1:
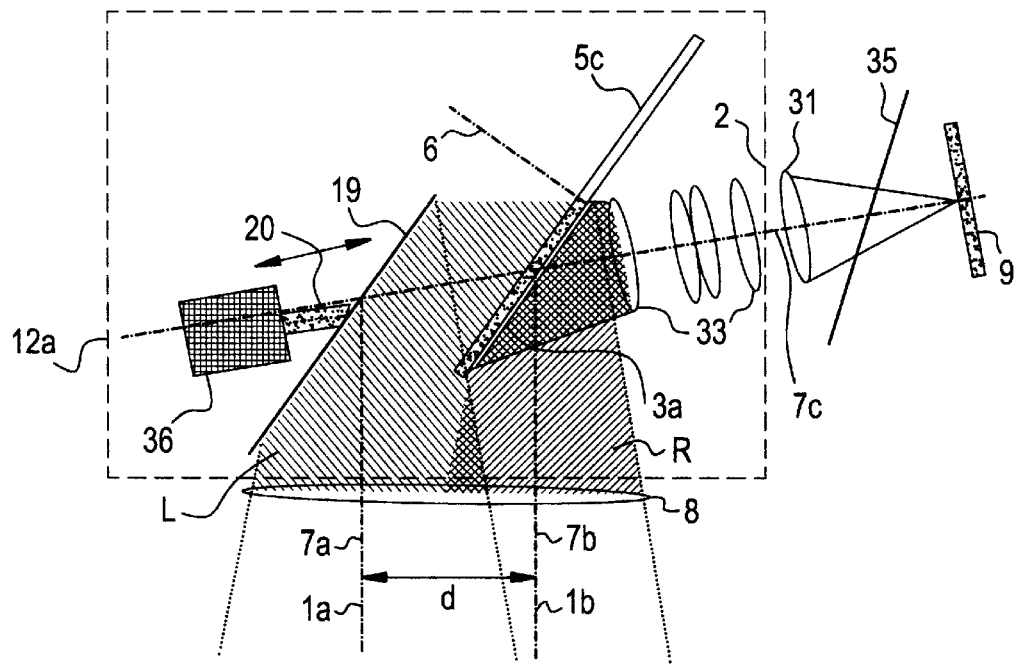
FIG. 1 shows the principle of a construction for stereo base setting having a rotating beam splitter with a mirror surface.

FIG. 1 shows as a component 3a a component as is described in more detail in FIG. 7.

Figure 9:
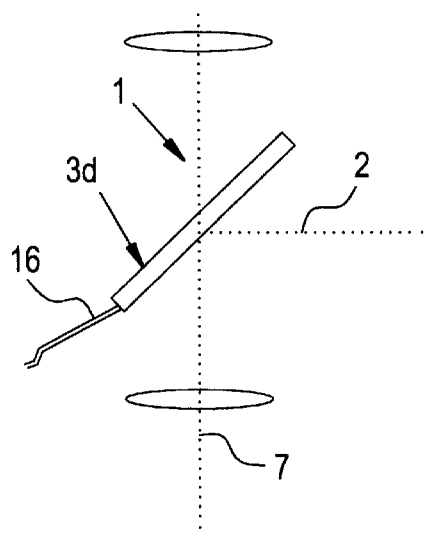
FIG. 9 shows the principle of an electronically switchable LCD shutter element, which can be switched over from a reflective into a transmissive state.

As an alternative, an element 3d according to FIG. 6 or according to FIG. 9 of the last-named patent application may also be provided instead.

FIG. 1 shows a stereomicroscope construction having two parallel first beam paths 1a, 1b along their central axes 7a and 7b, which are both placed through a main objective 8. The beam path 1a is incident after the main objective on a deflecting mirror 19 which is held on a push rod 20 and is set such that the central axis 7a is directed somewhat into the center of an image recording device 9 (CCD), which is arranged downstream of magnification optics 33 (zoom) and downstream of a tube lens 31. By means of displacing the deflecting mirror 19—via its actuating drive 36—the stereo base d between the two central axes 7a and 7b is changed, without the central axis 7a deviating from the center of the image recording device 9.

The other first beam path 1b is likewise incident in the representation shown on a switching element 3a or on a mirror, which is nonetheless designed on a semicircular disk 5c, which can be rotated by a motor about the axis 6 in accordance with FIG. 1. In the position shown, the beam path 1a to the image recording device 9 is blocked off thereby, while the beam path 1b is reflected as beam path 2 onto the image recording device 9. The central axis 7b of 1b is in this case aimed at the same point as the central axis 7a. The two beam paths 1a and 1b are thus superimposed consecutively but geometrically on one another. A further mirror 35 can also be located between the switching element 3a and the image recording device 9, in order to compensate the image mirroring caused by the optical arrangement. The image recording device would then have to be accordingly pivoted upward offset by approximately 90°.

The mirror on the semicircular disk 5c is configured—if appropriate also provided with curved boundary lines—in such a way that the read-out process is effectively synchronized to the image recording device 9 (CCD).

As a result of this construction, the disadvantage in existing stereomicroscopes is avoided, which disadvantage results from the normally fixed mechanical/optical spacing of the two beam paths 1a and 1b. To be specific, this previously fixed the stereo base and, in conjunction with the focal length of the main objective 8, the convergence angle of the stereoscopic beam path. The convergence angle, however, is again a decisive parameter of the depth magnification. By means of this variant of the invention, a setting of the convergence angle irrespective of the focal length of the main objective 8 is thus possible in an advantageous manner. This results in a possibility of control of the depth magnification. This has the effect of a decisive and ergonomic improvement to the stereoscopic perception of depth, without light losses occurring as in the case of Butterfield.

Figure 3:
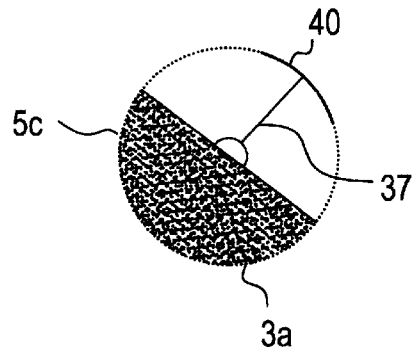
FIG. 3 shows the principle of a rotating beam splitter with a mirror surface.

As can be seen symbolically better from FIG. 3, the semicircular disk 5c is silvered as switching element 3a. The second part of the disk is mass-free, in order to avoid disturbances such as image offset or the like. Mounted at the edge, simply as a mass balance, is a balancing weight 40, which is held in relation to the axis of rotation 6 by a thin beam 37.

FIG. 6 shows a variant of FIG. 1 having equally long left and right beam paths 1a and 1b and an LCD shutter switching element 3d. As an alternative to FIG. 7, the latter could once more be designed on a thin glass disk 5—in accordance with FIG. 13. The image offset produced in the region of the remaining surface 5b is compensated in that in this case the mirror surface of the switching element 3a is not produced on that surface of the disk 5 facing the beam path 1b but, in the case of the LCD shutter element, approximately in the center of the disk at the LCD elements located there. Both the beam paths 1a and 1b thus suffer an image offset in the same direction.

The significance of the beam paths 1a and 1b in the case of the arrangement in FIG. 6 is their identical length as far as the image recording device 9. This identical length is achieved by means of the symmetrical construction about the central axis of the main objective 8, which is supported by two deflecting mirrors 11a and 11b. These could also be replaced by 30° prisms. The decisive factor is that they may be displaced (preferably simultaneously and to the same extent) along the arrow line shown.

Here, as also in the case of other designs, the mirror delivers, as already mentioned, an optimum light intensity, since neither losses as a result of polarization nor losses as a result of the use of a splitter occurs. FIG. 6, like FIG. 1, shows a CCD camera as an image recording device 9. However, this may also be designed as any other type of video camera.

The drive of the disk 5 is intended to be synchronized with the reading-out of the image recording device 9. In this arrangement it is advantageous if the reading-out of the image recording device 9 needs only part of the time during which the mirror feeds one of the two entry bundles of rays to the device. The clock frequency for controlling the reading-out of the recording device is to be calculated from this prescription and from the rotational speed of the aperture diaphragm (50 Hz). (See FIG. 17).

Figure 4:
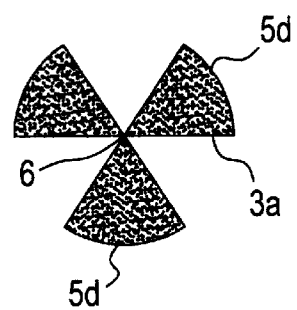
FIG. 4 shows a variant of FIG. 3.
Figure 5:
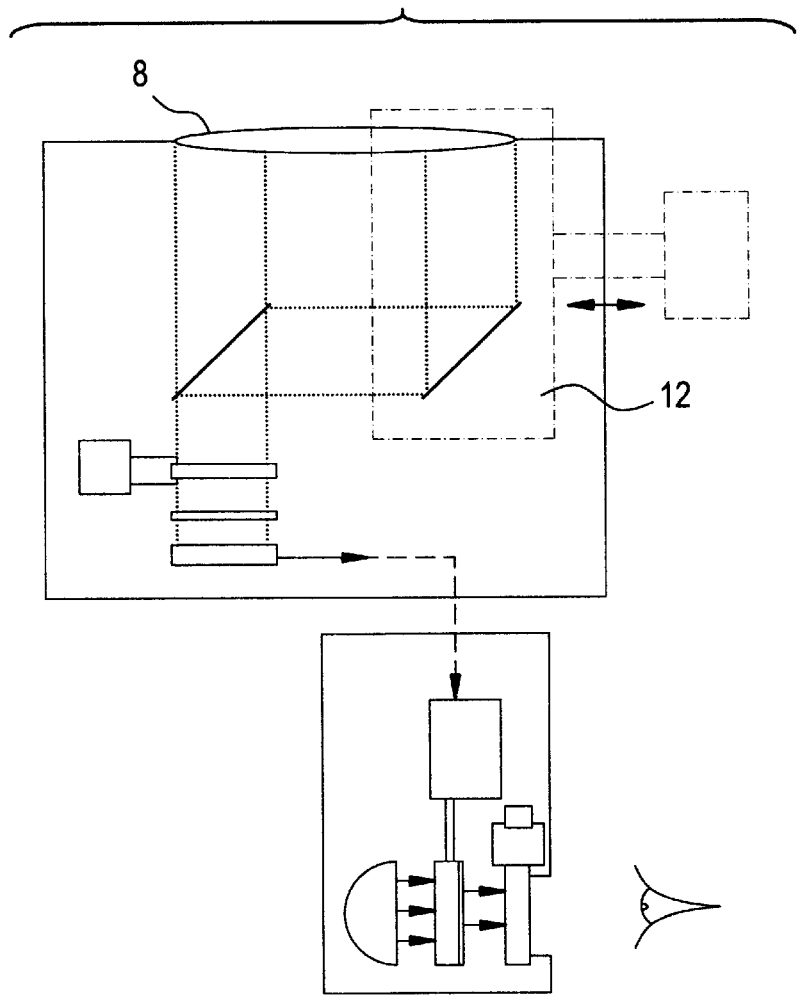
FIG. 5 shows the principle of a construction in accordance with U.S. Pat. No. 5,007,715 with an adjusting device according to the invention and only one main objective.

The switching element 3a, which is shown in FIG. 3, has a straight separating line between the reflective and transmissive part. This separating line can however be further optimized. FIG. 4 shows a variant of this having 3 reflective circular section areas 5d, which allow a reduction in the rotational speed of the switching element 3a.

The image data obtained is further processed in accordance with the specific patent applications.

Figure 2:
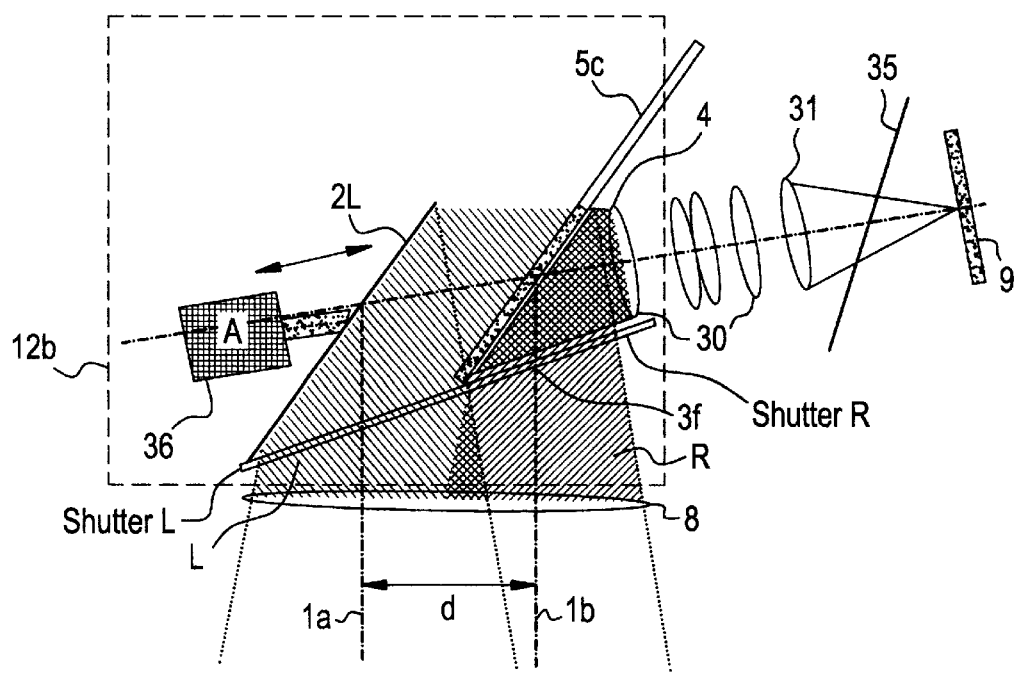
FIG. 2 shows the principle of a construction having a conventional optical nondisplaceable beam splitter which is preceded by an alternating shutter element for beam separation.

In the sense of the invention, it is not important which of the previously described switching elements 3 is used, although a rotating disk is preferred. Furthermore, as an alternative, in accordance with FIG. 2 instead of a switching element, a conventional (for example glass) beam splitter 4 is also employed, an active alternating shutter element 3f as an aperture diaphragm then is switched into the beam paths 1a and 1b alternately, said element making either the one or the other beam path 1a or 1b able to be passed. To this extent, reference is expressly made to FIGS. 22 to 28, which show appropriate aperture diaphragms.

Other variants have in each of the beam paths a plane plate which can be pivoted. A possibility for setting the stereo based results from the offsetting effect of the obliquely set plane plate. According to a further variant, a pivoting drive is provided, which moves both the plane plates synchronously. For this purpose, the plane plates are connected to the drive via a linkage. For specific electronic evaluation methods—for example in order to achieve a pixel document—it is even conceivable for the pivoting drive of the plane plates to be provided in an oscillating manner.

FIG. 7 shows a first beam path 1 having an optical axis 7 and containing a main objective 8 and an eyepiece 18. Located in this beam path 1, at an angle of about 45°, is a glass disk 5 which is rotatable about an axis 6, and which has a semicircular area 5a which is silvered facing the objective 8. The semicircular remaining area 5b is transparent. As indicated symbolically, the disk 5 may be driven by an electric motor, for example by a stepper motor 14. When the area 5a is in the beam path 1, the latter is reflected into a second beam path 2, split off therefrom. If, on the other hand, the remaining area 5b is located in the first beam path 1, the latter continues in a straight line freely as far as the eyepiece 18. The disk 5 in this way becomes a mechanooptical switching element or a silvered aperture diaphragm 3a.

FIG. 8 shows a variant of FIG. 7, in which, instead of the disk 5, an oscillatingly displaceable mirror is used as switching element 3b. This is driven by a reciprocating drive 15.

FIG. 9 shows a further variant of FIG. 7 having an electrically switchable switching element (e.g. LCD) 3d which, for example on account of liquid crystal changes, transfers from a transmissive into a reflective state. It is controlled via feedlines 16.

Figure 10:
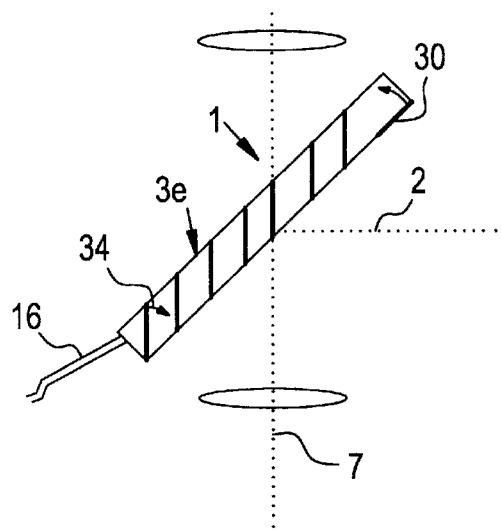
FIG. 10 shows the principle of a micromechanical lamella mirror construction as beam splitter with a transmissive and a reflective position.

FIG. 10 shows a further variant of FIG. 7 having a mechanooptical switching element 3e, which is designed as a micromechanical lamellar mirror construction. The individual, symbolically indicated lamellar mirrors 30 are, as indicated by the arrows 34, pivotable such that they in each case lie approximately parallel to the first beam path 1 or in each case obliquely thereto. In the first case the beam path 1 is continuous, in the second case it is deflected into the second beam path 2. The outermost right-hand lamellar mirror 30 is shown in this position.

Figure 11:
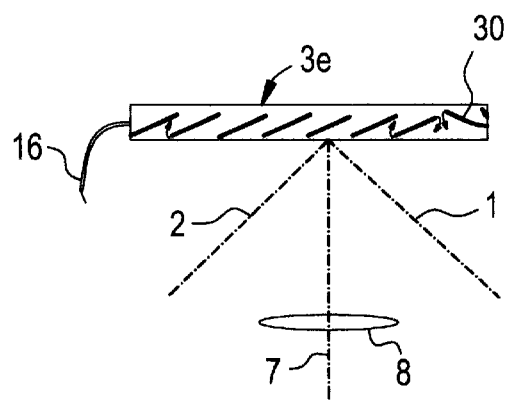
FIG. 11 shows the principle with a micromechanical lamella mirror construction as beam splitter with at least two reflection positions.

FIG. 11 shows a further mechanooptical switching element 3e, a, for example, micromechanical lamellar mirror construction for setting at least two lamella positions. Lamellae 30 are pivotable either about a central axis each or about one longitudinal edge each of the relevant lamella (cf. the arrows indicated). By means of these lamellae 30, reflective switching between beam path 1 or 2 is possible.

Figure 12:
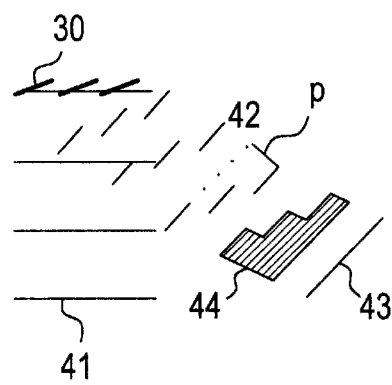
FIG. 12 shows the compensation of phase shifts on lamella mirrors according to FIG. 11.

FIG. 12 describes the compensation of phase differences of individual part-waves 42 at lamellar mirrors 30, starting from a planar wave 41, at a phase plate 44, with result 43. This invention, shown in FIGS. 11 and 12, may also be used independently.

Figure 13:
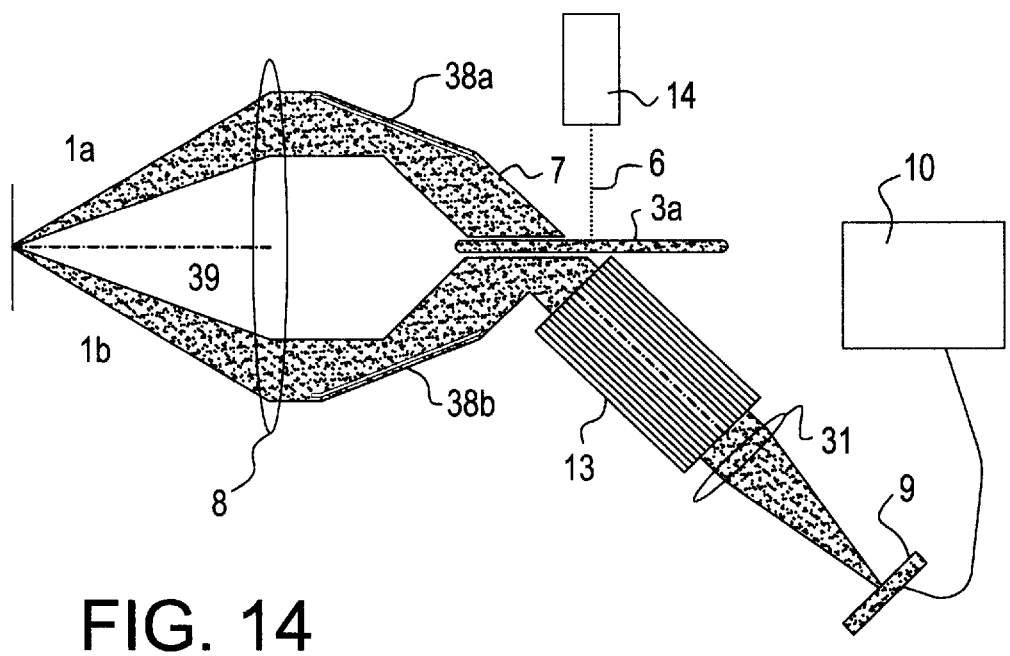
FIG. 13 shows a variant of FIG. 11, with equally long left and right beam paths and rotating switching element.

FIG. 13 shows a variant of FIG. 1 having identically long left and right beam paths 1a and 1b and a rotating switching element 3a. As an alternative to FIG. 3, the latter is once more designed on a thin glass disk 5—in accordance with FIG. 14.

One of the main features of the beam paths 1a and 1b in the case of the arrangement in FIG. 13 is their identical length as far as the zoom 13 or as far as the image recording device 9. This identical length is achieved by means of the symmetrical construction about the central axis of the main objective 8, which is supported by two deflecting mirrors 38a and 38b. The latter could also be replaced by prisms.

Here, as also in the case of the other designs, as already mentioned, the mirror supports an optimum light intensity, since neither losses as a result of polarization nor losses as a result of the use of a splitter occur. FIG. 13, like FIG. 1, shows a CCD camera as image recording device 9, but this could also be designed as any other type of video camera.

The drive of the disk 5 (e.g. FIG. 14 and FIG. 13) is intended to be synchronized with the reading-out of the image recording device 9. In this case it is advantageous if the reading-out of the image recording device 9 needs only part of the time during which the mirror feeds one of the two entry bundles of rays to the device. The clock frequency for controlling the reading-out of the recording device is to be calculated from this prescription and from the rotational speed of the aperture diaphragm. The necessary clock signals are advantageously extracted by means of various frequency dividers from the output signal of an oscillator, as can be seen from FIG. 19 (in this connection, reference is expressly made to the Swiss patent application 135/94 and, respectively, to the PCT patent application based thereon, which gives information about the technique for video signal processing which is particularly advantageously to be used within the scope of this invention; the appropriate statements about the storage technique of the frames or fields, respectively, or their conversion and display as a raster image count as disclosed herein).

Figure 14:
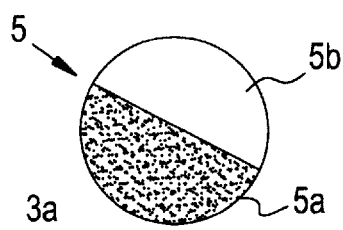
FIG. 14 shows a variant of the switching element according to FIG. 1, as used in FIG. 3.

The switching element 3a shown in FIG. 14 has a straight separating line between the reflective and transmissive part. This separating line can, however, be optimized further. Such an optimized separating line can be found by means of experiments.

The image data obtained are further processed by means of a memory and a special read-out process, in order to reduce the flicker and the movement jitter in the stereo images reproduced. At this point it should be noted that this flicker and jitter fundamentally occurs in all systems in which the left and right frame are fed alternately to a recording device. The said read-out control is therefore able to be used not only in the previously described system but in each device having a geometrical superimposition of the left and right frames. The read-out control and the device for implementing this control for this reason represent an independent invention which can be pursued further, irrespective of the use of the mechanical aperture diaphragms.

Figure 15:
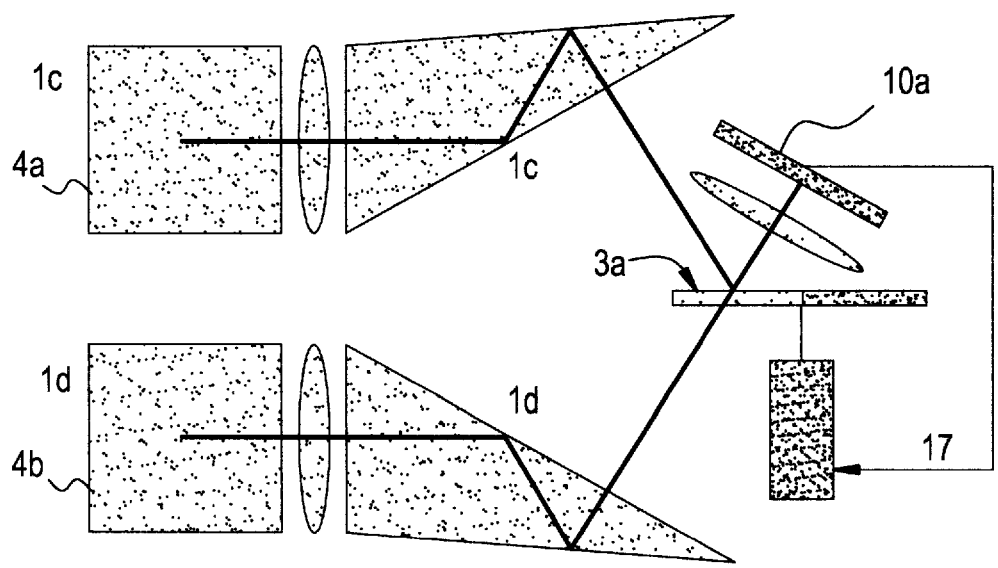
FIG. 15 shows the principle of a microscope with reflection of 3D images and rotating switching elements according to the invention.

FIG. 15 shows a construction for reflecting images from a display 10a into two eyepiece beam paths 1c and 1d of a stereomicroscope. This construction—and also that of FIG. 18—could also be equipped with an image recording device instead of the display 10a. Such an image recording device could optionally also be arranged above an additional beam splitter, in addition to the display 10a. Here, too, prisms allow an identical beam path length. The likewise symbolically represented switching element 3a allows the transfer of successive images on the display successively into the two beam paths 1c and 1d. Practically speaking, the display is connected to electronics, not shown, which in each case displays one of the successive images the wrong way round, in order to be able to see two upright frames, the right way round, in the stereoscopic field of view of an observer.

Figure 16:
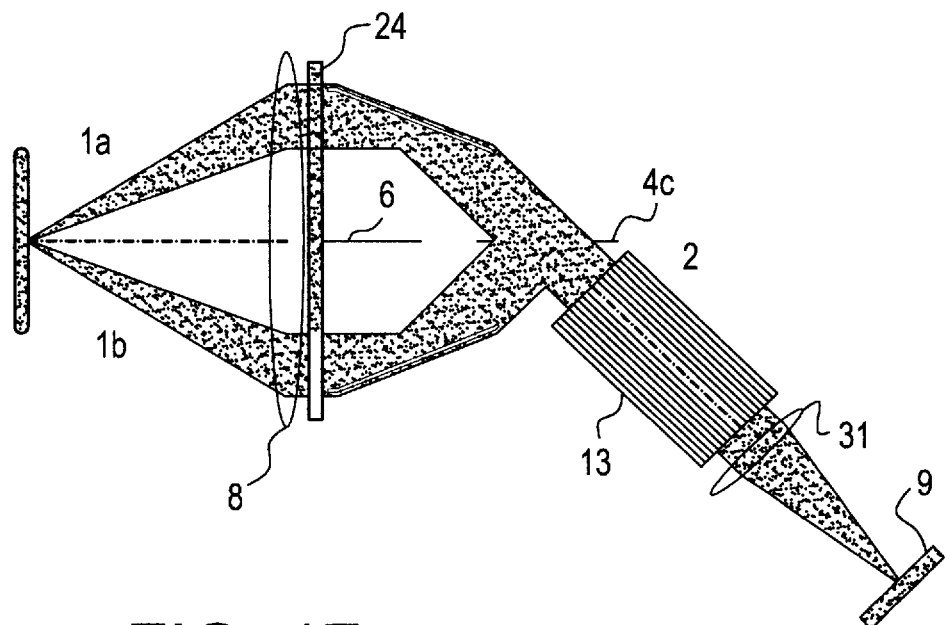
FIG. 16 shows a variant of FIG. 13 with splitter (4C) and switching aperture diaphragms.
Figure 17:
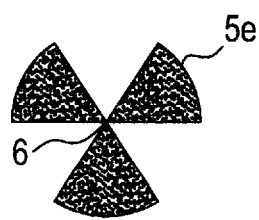
FIG. 17 shows switching element having at least two shutter lamellae.

FIG. 16 shows a variant of FIG. 13 having a rotating aperture diaphragm 24 which, for the purpose of reducing the rotational speed, can for example be designed in accordance with FIG. 17, and a splitter 4c. As an alternative, the aperture diaphragm 24 can also be equipped as a switching element having at least two shutter lamellae—one for each beam path.

Figure 18:
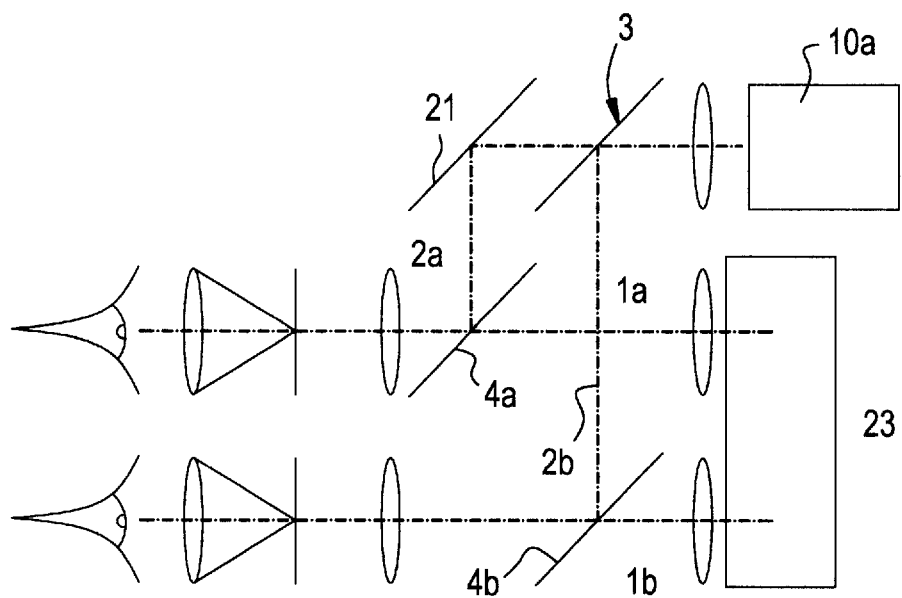
FIG. 18 shows a variant of FIG. 15 with a display displaced to the side.

The construction in accordance with FIG. 18 is a variant of FIG. 15 having two beam splitters 4a and 4b, one of which cooperates with a rigid mirror 21 and the other with an electrooptical switching element 3 of any configuration within the scope of the invention. The parts 21 and 3 alternately expose the view of the display 10a, the image from which is superimposed on the eyepiece beam paths. In this case, this may be a stereoscopic or else a monoscopic image.

Figure 20:
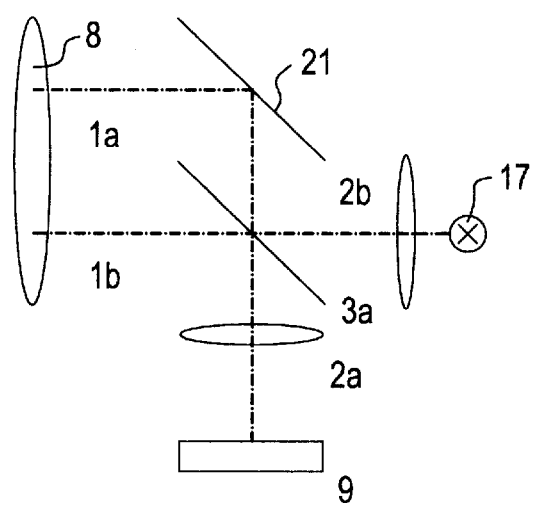
FIG. 20 shows a construction having integrated illumination through the main objective.

The construction in accordance with FIG. 20 represents a solution having integrated illumination. A light source 17 is arranged in direct prolongation of the beam path 1b, and the switching element 3a is silvered on both sides. In the position shown, the light from the light source 17 is reflected via the one mirror on the switching element 3a and via the mirror 21 into the beam path 1a. The light source illuminates the object 22 in this way, while said object or its frame is simultaneously recorded by the image recording device 9 via the other mirror on the switching element 3a and via the beam path 1b. If the switching element 3a is switched to transparency, the light source 17 then illuminates the object via the beam path 1b, while the other frame can be recorded via the beam path 1a. The light source may also be designed as a stroboscope and can be clocked both with the image recording device and also with the switching element 3a. As an alternative or at the same time, measurements or insertions etc. may also be made via the illumination beam path 2b.

In the sense of this construction it is not important which of the above-described switching elements 3 is used, although a rotating disk is preferred. Furthermore, as an alternative, instead of a switching element a conventional (e.g. glass) beam splitter could also be used, active aperture diaphragms then having to be switched into the beam paths 1a and 1b alternately, said aperture diaphragms then making either one or the other beam path 1a or 1b continuous. To this extent, reference is expressly made to FIGS. 22 to 28, which describe corresponding aperture diaphragms. The construction in accordance with FIG. 20 or its variants could accordingly also be used independently.

It may be advantageous to use pellicles for the construction of the rotating switching elements 3. These are frames on which virtually weightless films are clamped. On the one hand, these have, virtually no offset and, on the other hand, they are very light, so that weight problems are dispensed with.

The following designs, or FIGS. 22 to 28 respectively, are not restricted to the exemplary embodiments shown. Above all in combination with the teachings of the Swiss patent applications cited above and the other figures, further arbitrary variants may be represented. Thus, as already mentioned, not only rotating and translatory movements are conceivable for the aperture diaphragm, stationary electrooptical aperture diaphragms with a hundred percent switchover capacity and without light intensity loss in the continuous range are conceivable, as are mechanical aperture diaphragms which can be pivoted in and out. Mirrors used can in many cases also be replaced by similarly acting prisms. All these variants fall under the disclosure content of this application.

Figure 23:
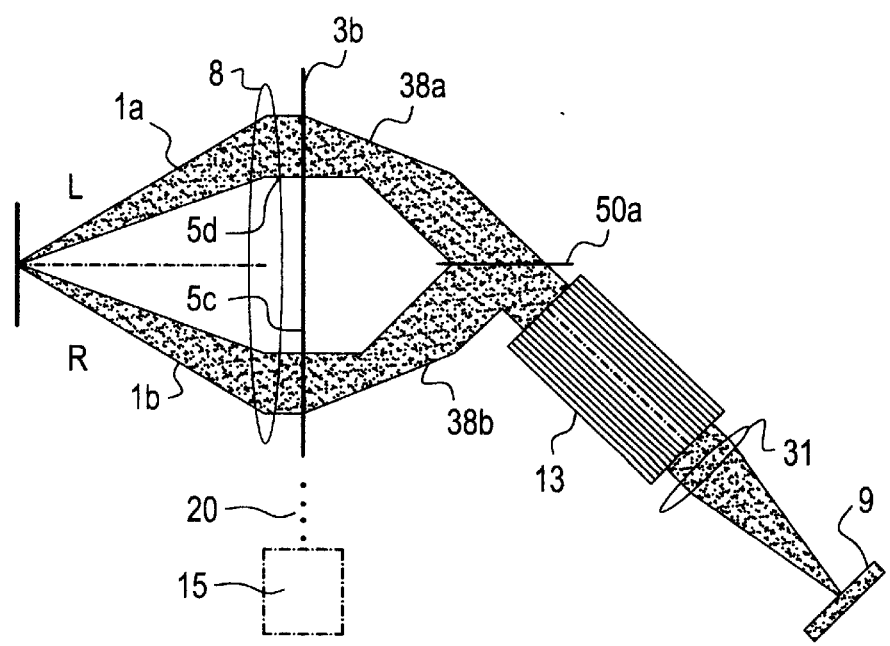
FIG. 23 shows the principle of a translatably displaceable aperture diaphragm for the same application according to FIG. 1.
Figure 24:
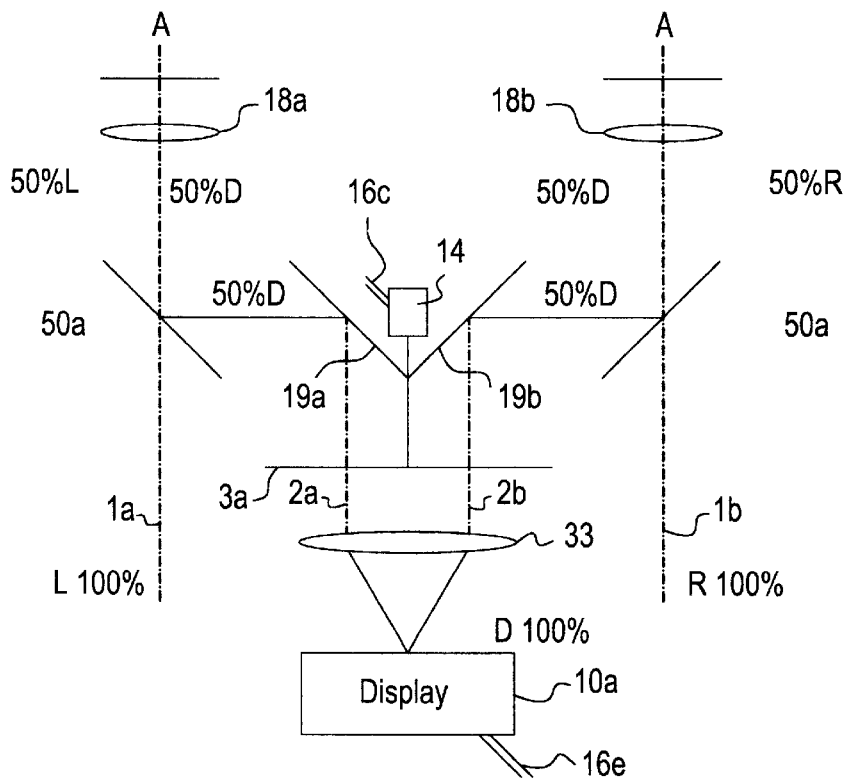
FIG. 24 shows a variant to the construction according to FIG. 6 with a pupil beam splitter.

FIG. 24 shows a construction for the recording of left and right frames of a stereoscopic beam path one after the other in a time sequence. As in the construction according to FIG. 23 and FIG. 26, in this case the right and left beam path 1a and 1b are equally long. A rotating aperture diaphragm 3a makes them alternately continuous or blocking. Said aperture diaphragm is designed on a thin glass disk 5, for example by coating the disk approximately one half black and opaque 5a (FIG. 14). The image offset which is theoretically produced in the region of the completely transparent remaining area 5b, (apart from any reflection at the glass disk, which is preferably reduced by an antireflection coating) is compensated by the fact that, depending on the position of the disk 5, it acts equally on both the beam paths 1a and 1b. The opaque area 5a of the disk 5 is preferably also (or—providing the silvering is light-tight—only) silvered, in order to return light split off by it into the respective beam path 1a or 1b.

The beam paths 1a and 1b are in this arrangement in a favorable way identically long as far as the zoom 13 or, respectively, as far as the image recording device 9. This identical length is achieved by means of the symmetrical construction about the central axis of the main objective 8, which is supported by two deflecting mirrors 38a and 38b. The latter could also be replaced by, for example, 30° prisms.

The two mirrors 38a and 38b reflect the two beam paths 1a and 1b at a common beam splitter 50a, by means of which they are superimposed geometrically on each other. The loss of about 50% of the light energy which generally occurs in so doing is the only light intensity loss occurring in this system which must be tolerated. According to the development described further above, this loss may also be avoided if a switching element 50b (FIG. 26) is used in place of the beam splitter 50a, said switching element switching between a reflective and a transmissive state, as described at the corresponding places in the application mentioned. In the case of the invention represented, however, no light intensity losses occur as the result of a polarizer or analyzer. FIG. 22, FIG. 23, FIG. 27 and FIG. 25 show a CCD camera as image recording device 9. However, the image recording device 9 can also be designed as any other type of video camera.

Figure 25:
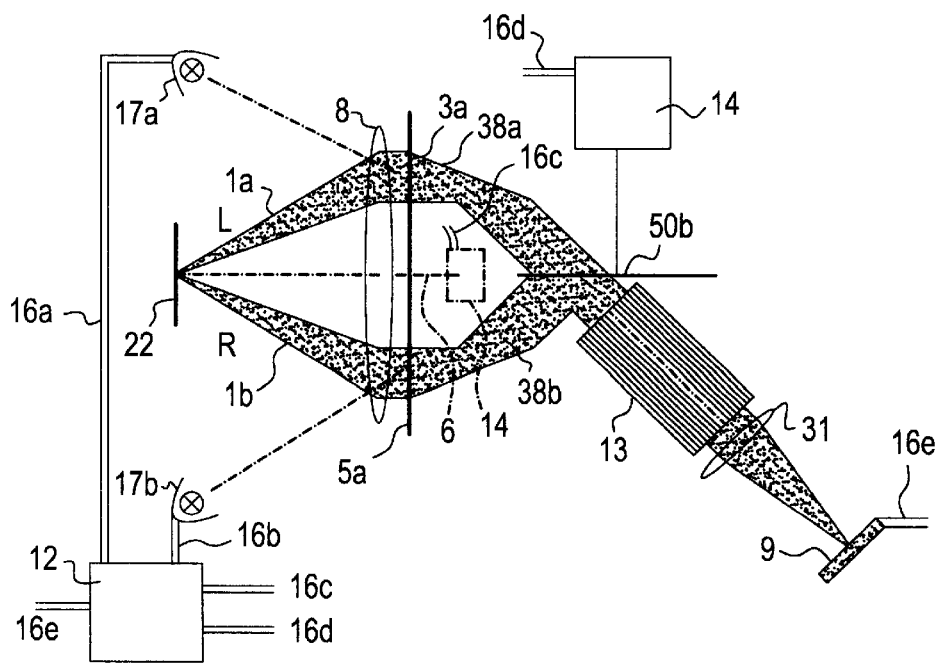
FIG. 25 shows a further variant having an aperture diaphragm, mirror surfaces and stroboscopic illumination.
Figure 26:
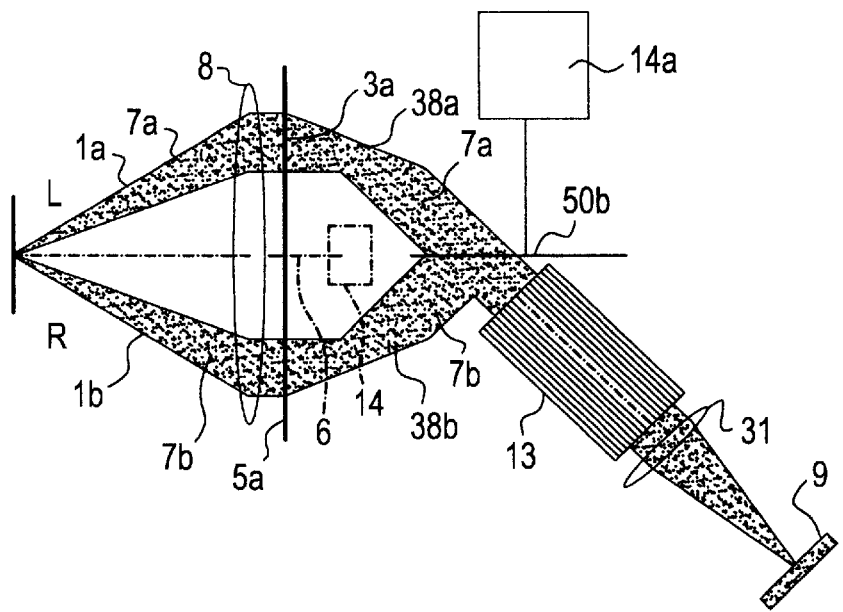
FIG. 26 shows a similar construction to that of FIG. 22, the stationary splitter being replaced by a rotating splitter.

The drive (motor 14) of the disk 5 is to be synchronized with the reading-out of the image recording device 9. It is advantageous in this case if the reading-out of the image recording device 9 needs only part of the time during which the aperture diaphragm makes one of the two entry bundles of rays available to the device 9. The clock frequency for controlling the read-out of the recording device 9 is to be calculated from this prescription and from the rotational speed of the aperture diaphragm (e.g.: 50 Hz). The necessary clock signals are advantageously extracted by means of various frequency dividers from the output signal of an oscillator (clock), as can be seen from FIG. 19. A reduction in rotational speed can be achieved if, instead of an aperture diaphragm according to FIG. 3, an aperture diaphragm according to FIG. 4 is selected, whose three blocking areas are of circular segment design. In FIG. 25 it can be seen, indicated symbolically, that the corresponding drives 14 for the rotatable disks are driven by a common controller 12, which also undertakes the clocking of the image recording device 9 and the clocking of any stroboscopic illumination 17a and 17b.

Such a stroboscopic illumination is successfully used in those arrangements in which the aperture diaphragm 3a is additionally designed to be silvered. In the position of the aperture diaphragm 3a which is shown in FIG. 25, for example, the stroboscope lamp 17b emits a light flash which is reflected via the area 5a into the beam path 1b and illuminates the object 22 in this way. At the latest following a 180 degree rotation of 3a, a light flash from the stroboscope lamp 17a illuminates the object 22 via the beam path 1a.

The switching element 3a shown in FIG. 14 has a straight separating line between the reflective and transmissive part. This separating line can, however, be optimized further.

Figure 19:
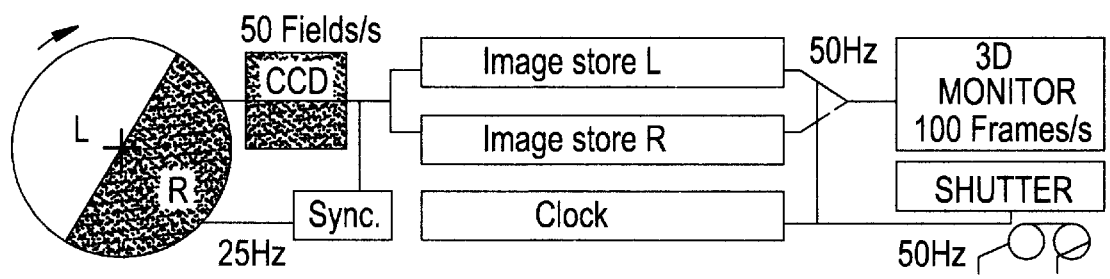
FIG. 19 shows a circuit for driving and synchronizing a mechanooptical switching element.

The image data obtained are, as indicated for example in FIG. 19, further processed by means of a memory and a special read-out process, in order to reduce the flicker of and the movement jitter in the reproduced stereo images. Here it should be noted that this flicker and jitter fundamentally occur in all systems in which the left and right frames are alternately fed to a recording device. The said read-out control can therefore be used not only in the previously described system but in any device having a geometrical superimposition of the left and right frames. The read-out control and the device for implementing this control therefore represents an independent invention, which can be followed further irrespective of the use of the mechanical aperture diaphragms.

Figure 22:
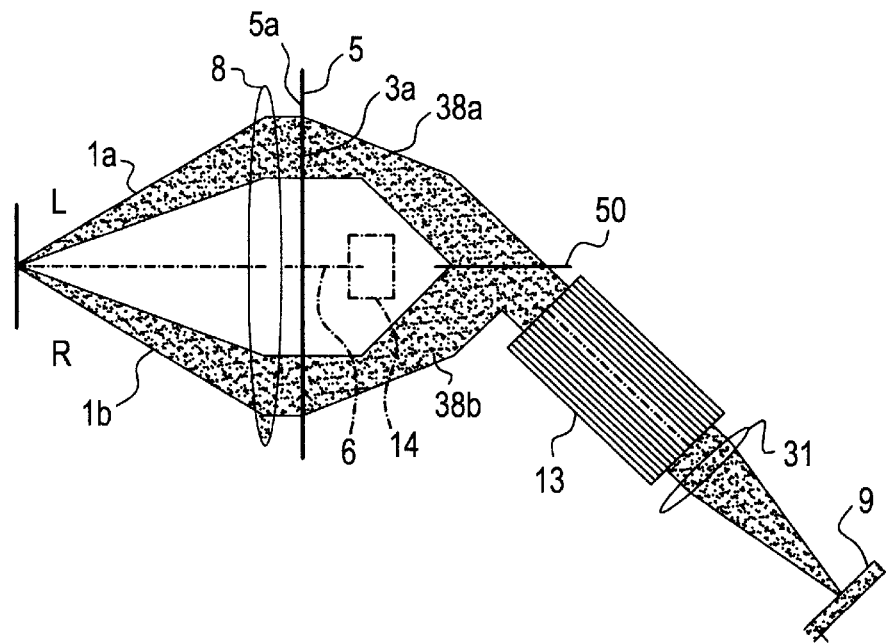
FIG. 22 shows the principle of a rotating aperture diaphragm made from glass according to the invention, together with an image recording device.

FIG. 23 shows a variant of FIG. 22 in which, instead of the disk 5, an aperture diaphragm which can be displaced in an oscillating manner is used as switching element 3b. The latter is driven by a reciprocating drive 15. In this case, the aperture diaphragm comprises two blocking areas 5d and 5e which, for example, are applied to a rectangular glass disk in such a way that in the one position (shown) the beam path 1a is blocked and in the other the beam path 1b is blocked. Instead of a glass disk, such an aperture diaphragm 3b could also be constructed, for example, from sheet metal, in which only the exposed regions of the aperture diaphragm are stamped out.

FIG. 9 of the Swiss patent application shows an electronically switchable switching element (3d) which, for example because of liquid crystal changes, transfers from a transmissive into a reflective state. Two such elements could, for example, be inserted into the beam paths 1a and 1b instead of the aperture diaphragms 3a or 3b, in order to block the light transmissivity alternately in a corresponding manner.

As a further variant to 3a and 3b, the mechanooptical switching element 3e, which is designed as a micromechanical lamellar mirror construction according to FIG. 10, are conceivable, such a lamellar construction then preferably being placed into each beam path 1a, 1b.

Figure 28:
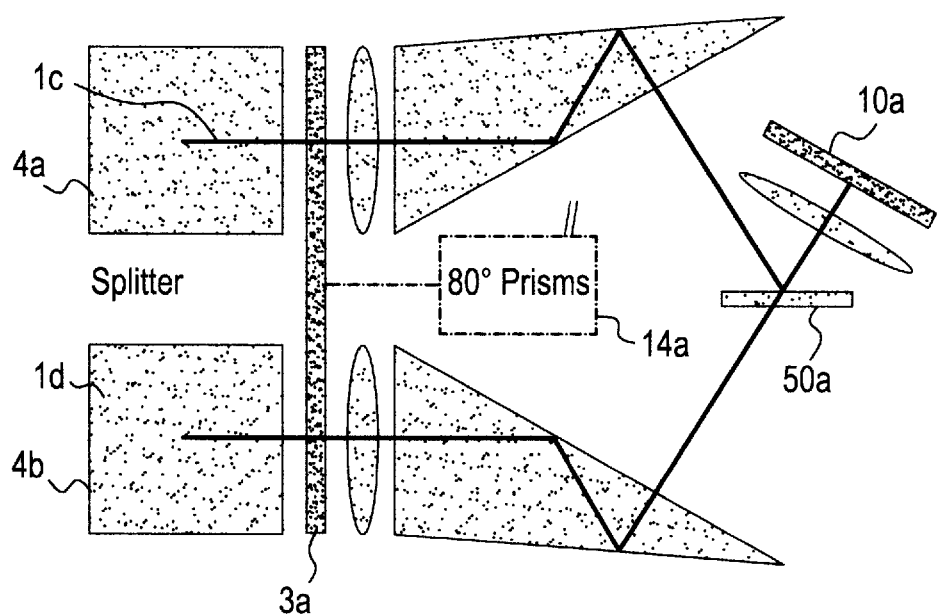
FIG. 28 shows a construction for reflecting in images from a display.

FIG. 28 shows a construction for reflecting images from a display 10a into two eyepiece beam paths 1c and 1d of a stereomicroscope. 30° prisms allow an identical beam path length here, too. The likewise symbolically represented aperture diaphragm 3a allows the transfer of successive images on the display one after another into the two beam paths 1c and 1d. In a practical way, the display is connected to electronics, not shown, which in each case displays one of the successive images the wrong way round, in order to be able to see two upright frames in the stereoscopic field of view of an observer.

Figure 27:
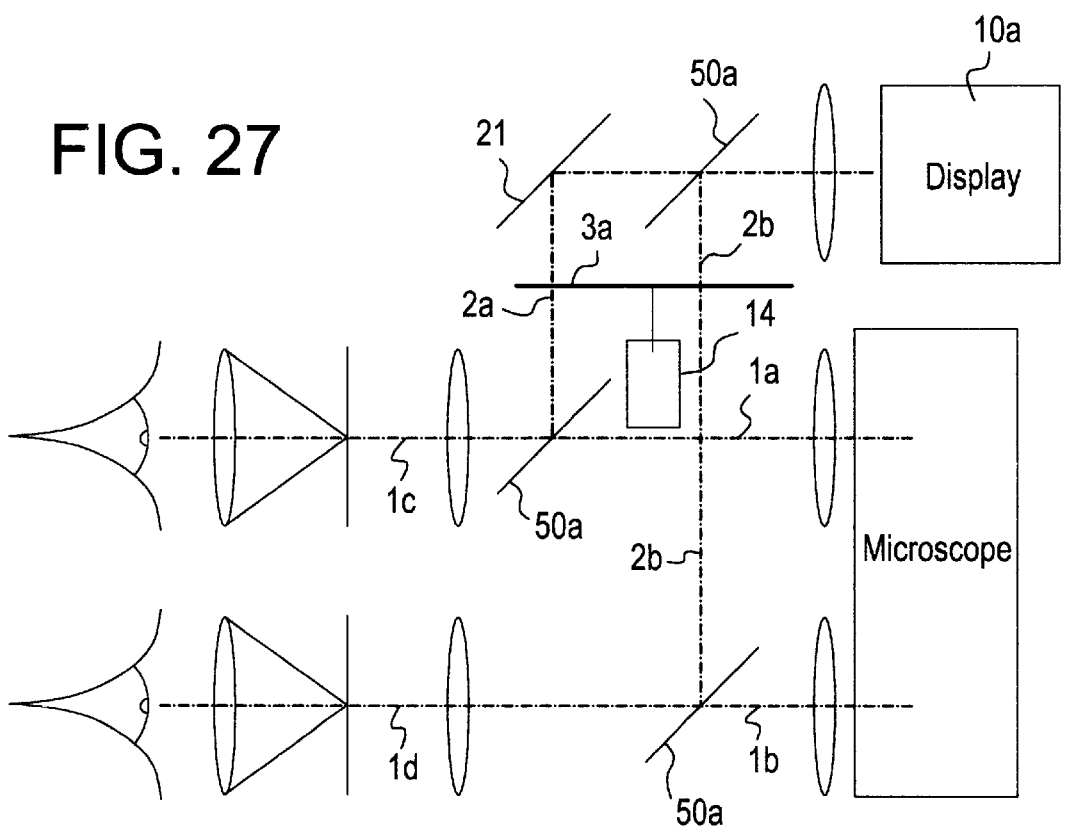
FIG. 27 shows the principle of a construction having a display for the insertion of an image into the eyepiece beam path.

The construction in accordance with FIG. 27 is a variant of FIG. 28 having two beam splitters 50a and 50b, one of which cooperates with a rigid mirror 21 and the other with a third beam splitter 50a. An aperture diaphragm 3a according to the invention alternately exposes the view of the display 10a for the beam paths 2a and 2b, the image from which display is superimposed on the eyepiece beam paths. In this case, this may be a stereoscopic or else a monoscopic image. In the latter case, the aperture diaphragm 3a may be dispensed with.

The construction according to FIG. 24 operates with a pupil splitter 19 made of two deflecting mirrors 19a and 19b, each of which deflects half the image information, as it is supplied by the display 10a, to the beam path 1a and 1b, respectively. At the point of intersection of the beam paths 2a and 2b with 1a and 1b, beam splitters 50a are arranged which allow the geometric superimposition of the two beam paths 1a and 2a, and 1b and 2b, respectively. A rotating aperture diaphragm 3a according to the invention alternately covers the corresponding regions in front of the pupil splitter 19a, so that in each case only one of the two beam paths 1a or 1b is supplied with the image information. If the display correspondingly switches in each case between a right and a left frame, a stereoscopic image, which is superimposed on the 3D image from the beam paths 1a and 1b, is produced for an observer at the eyepiece 18a and 18b. From this construction, use of a second display 10 can be saved. The stereomicroscope according to the invention is accordingly of smaller construction.

The last described development thus relates to a stereomicroscope in which two beam paths 1a, b; 2a, b are intended to be superimposed geometrically but successively in time in a transparent manner. The known disadvantages, such as high light loss as a result of polarizers and analyzers or such, as undesired simultaneous superimposition of image information are intended to be avoided. This is achieved by means of a mechanical aperture diaphragm 3 which either exposes the one or the other beam path 1a, b; 2a, b and blocks the respective other beam path.

| List of reference symbols | |
|---|---|
| 1a, b | First beam path |
| 1' | Displaced first beam path |
| 2a, b | Second beam path (geometrically superimposed first beam paths) |
| 2' | Displaced second beam path |
| 3 | Mechanooptical switching element |
| 3a, b, c | Opaque and preferably silvered aperture diaphragm |
| 3d | LCD shutter element |
| 3e | Micromechanical lamellar mirror |

-continued

List of reference symbols

| | |
|---|---|
| | construction |
| 3f | LCD alternating shutter element |
| 4 | Beam splitter |
| 4a, b, c | Beam splitter |
| 5 | Disk |
| 5a | Semicircular area |
| 5b | Remaining area of disk 5 |
| 5c | Circular segment areas |
| 5d | |
| 6 | Axis for disk |
| 7 | Central axis |
| 7a, b | Central axis |
| 8 | Main objective |
| 9 | Electronic image recording device |
| 10 | Display |
| 10a | Display |
| 11a, b | Mirror |
| 12a, b, c | Adjusting device |
| 13 | Zoom |
| 14a, b | Motor |
| 15 | Reciprocating drive |
| 16 | Feed line |
| 17 | Light source |
| 18 | Eyepiece |
| 19 | Deflecting mirror |
| 20 | Push rod |
| 21 | Rigid mirror |
| 22 | Object |
| 23a, b, a', b'; c, d | Plane plate |
| 24 | Pivoting drive |
| 25 | Linkage |
| 30 | Lamellar mirror of 3e |
| 31 | Tube lens |
| 32 | |
| 33 | Magnification optics |
| 34 | Arrows |
| 35 | Further mirror |
| 36 | Actuating drive |
| 37 | Beams |
| 38a, b | Deflecting mirror |
| 39 | Retroprism |
| 40 | Balance weight |
| 41 | Planar wave |
| 42 | Partial waves |
| 43 | Result |
| 44 | Phase plate |
| 50a, b | Beam splitter |
| d | Stereo base |
| p | Phase pin |

The reference symbols listed in this list of reference symbols also relate to components of the mentioned and following PCT patent applications based on CH1088/94-3 and 1090/94-1, which can preferably be used together with the present inventions.

We claim:

1. A stereomicroscope, comprising:
a left and a right stereo beam path through a single main objective for left and right stereo beams;
an electronic image recording device with a single recording beam path, said recording beam path being substantially transverse to said left and right stereo beam paths; and
a device for geometrically superimposing the left and right stereo beams into said recording beam path, said device having a left mirror and a right mirror, said left mirror deflecting said left stereo beam into said recording beam path and said right mirror deflecting said right stereo beam into said recording beam path,
wherein said left mirror is moveable along said recording beam path in order to change a stereo base of the stereomicroscope, and
wherein said right mirror is adjustable so as to deflect or not deflect said right stereo beam into said recording beam path and at the same time to block or not block said left stereo beam from being superimposed into said recording beam path such that the image recording device is confronted with either the left stereo-beam or the right stereo beam along the recording beam path in an oscillating manner.

2. A stereomicroscope as set forth in claim 1, wherein said right mirror includes a silvered aperture diaphragm which is inserted in and out of the recording beam path.

3. A stereomicroscope as set forth in claim 1, wherein said right mirror includes an LCD shutter element which is switchable between a blocking and a transmissive state, wherein the blocking state blocks the left stereo beam and reflects the right stereo beam into said recording beam path.

4. A stereomicroscope as set forth in claim 2, wherein said diaphragm includes an approximately semicircular blocking reflective area and an approximately semicircular area which is transmissive, and wherein the diaphragm is rotatable about an axis which is substantially oblique with respect to said recording beam path and said right stereo beam in order to swivel the blocking reflective area in and out of the recording beam path and the right stereo beam path at the same time.

5. A stereomicroscope as set forth in claim 2, wherein said diaphragm includes a plurality of silvered aperture diaphragms arranged rotatably as circular segment areas about an axis which is substantially oblique with respect to said recording beam path and said right stereo beam.

6. A stereomicroscope, comprising:
a left and a right stereo beam path through a single main objective for left and right stereo beams;
an electronic image recording device with a single recording beam path, said recording beam path being substantially oblique with respect to said stereo beams; and
a device for geometrically superimposing the left and right stereo beams into said recording beam path, said device having a left mirror and a right mirror system, said left mirror deflecting said left stereo beam into said recording beam path and said right mirror system deflecting said right stereo beam into said recording beam path,
wherein said left mirror is moveable in order to change a stereo base of the stereomicroscope,
wherein said right mirror system includes a right deflecting mirror and a right mirror, said right deflecting mirror deflecting said right stereo beam substantially vertically to said recording beam path,
wherein said right mirror is adjustable to deflect or not deflect said right stereo beam from the substantially vertical direction into said recording beam path and at the same time to block or not block said left stereo beam from being superimposed into said recording beam path such that the image recording device is confronted with either the left or the right stereo beam along the recording beam path in an oscillating manner.

7. A stereomicroscope as set forth in claim 6, wherein said right deflecting mirror is moveable in order to change the stereo base of the stereomicroscope.

8. A stereomicroscope as set forth in any one of the preceding claims, wherein the right mirror is driven in a stepwise manner and remains in a selected switched state for a short time and wherein the image recording device includes exposure control for activation of the image recording device in a clocked manner related to a switching state of the right mirror.

9. A stereomicroscope as set forth in any one of the claims 1–7, wherein the right mirror has silvering on both sides a reflective side for the right stereo beam and a blocking side for the left stereo beam, and wherein the stereomicroscope further includes a light source arranged in direct prolongation of the right stereo beam path to illuminate an object under the main objective via said left stereo beam path when the right mirror is in a blocking state and via the right stereo beam path when the right mirror is in a transmissive state.

10. A stereomicroscope as set forth in any one of the claims 1–7, wherein the sum of a length of the left stereo beam path and the recording beam path is equal to the sum of a length of the right stereo beam path and the recording beam path.

11. A stereomicroscope as set forth in any one of the claims 1–7, wherein a direction of the left stereo beam and a direction of the right stereo beam intersect each other, after being deflected, substantially vertically.

* * * * *

UNITED STATES PATENT AND TRADEMARK OFFICE
CERTIFICATE OF CORRECTION

PATENT NO. : 5,867,309
DATED : February 2, 1999
INVENTOR(S) : Roger Spink et al.

It is certified that error appears in the above-identified patent and that said Letters Patent is hereby corrected as shown below:

On the title page, item:

[73] Assignee, delete "Leica Geosystems AG, Heerbrugg, Switzerland" and replace with --Leica Mikroskopie Systeme AG, Heerbrugg, Switzerland--.

Signed and Sealed this

Twenty-eighth Day of December, 1999

Attest:

Q. TODD DICKINSON

Attesting Officer    Acting Commissioner of Patents and Trademarks